United States Patent [19]

Shimizu et al.

[11] 4,031,302
[45] June 21, 1977

[54] PROCESS FOR PREPARING GRANULAR RUBBER

[75] Inventors: Akihiko Shimizu; Yasuhiro Sakanaka, both of Shin-nanyo, Japan

[73] Assignee: Toyo Soda Manufacturing Co., Ltd., Japan

[22] Filed: Sept. 25, 1975

[21] Appl. No.: 616,894

[30] Foreign Application Priority Data

Sept. 25, 1974  Japan .......................... 49-110176

[52] U.S. Cl. .......................... 528/486; 23/252 R; 260/821; 528/488
[51] Int. Cl.² .......................... C08C 1/15; C08F 6/22
[58] Field of Search ............ 260/821; 528/486, 488

[56] References Cited

UNITED STATES PATENTS

| | | | |
|---|---|---|---|
| 2,340,243 | 1/1944 | Beal | 18/57 |
| 2,556,260 | 6/1951 | Downing | 260/92.8 |
| 3,160,620 | 12/1964 | Petersen | 260/92.3 |
| 3,751,402 | 8/1973 | Broering | 260/82.1 |

*Primary Examiner*—Stanford M. Levin
*Attorney, Agent, or Firm*—Oblon, Fisher, Spivak, McClelland & Maier

[57] ABSTRACT

Granular rubber is prepared by allowing a latex mixture of a rubber latex and an aqueous solution of a high molecular weight polyanion containing carboxylate groups and/or hydroxyl groups to fall freely into an aqueous solution of an alkaline earth metal salt and separating the granular rubber which forms.

6 Claims, 3 Drawing Figures

PROCESS FOR PREPARING GRANULAR RUBBER

BACKGROUND OF THE INVENTION

1. Field Of The Invention

The present invention relates to a novel process for preparing a granular rubber and an apparatus for preparing the same.

2. Description Of The Prior Art

Heretofore, rubber has been used in the form of blocks or chips of certain desired sizes for the molding of rubber objects. In molding processes which use blocks of rubber, the blocks are cut and weighed and kneaded with a Banbury mixer or by roller mixing. However, because the rubber blocks are relatively large and because their sizes are not constant, the blocks are difficult to handle and precise weighing of the blocks is difficult. Because of these problems, it has been difficult to automatically weigh and process the rubber, thus requiring much labor to process the rubber.

Recently, various thermoplastic resins have been blended with rubber increasingly in enlarging fields of application. However, in the molding of rubber materials, it has been difficult to feed the rubber chips continuously at constant speed to a molding machine such as a uniaxial extruder or a biaxial extruder, and consequently, batch-type kneading methods have been employed. Batch type kneading techniques, however, have had the disadvantages of requiring long blending periods for the blending of the rubber with resins which increases the cost. Accordingly, it has been proposed to prepare granular rubbers which can be easily weighed and handled without trouble and can be fed at constant rates to a molding machine such as a uniaxial extruder or a biaxial extruder. In this technique, rubber blocks are formed by the adherence of rubber pellets to themselves because of the tackiness of the rubber pellets, even though pellets of rubber are prepared. Therefore, it has been difficult to obtain the desired objectives by this technique.

A need, therefore, continues to exist for a method by which granular rubber can be fed easily and conveniently to a molding apparatus.

SUMMARY OF THE INVENTION

Accordingly, one object of the present invention is to provide a granular rubber which can be continuously fed at a constant speed to a molding machine.

Briefly, this object and other objects of the present invention, as will hereinafter become more readily apparent, can be attained by a process for preparing a granular rubber by dropwise adding a mixture of a rubber latex and a high molecular weight polyanion containing carboxylate and/or hydroxyl groups to an aqueous solution of an alkaline earth metal salt and separating the granular rubber which forms.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
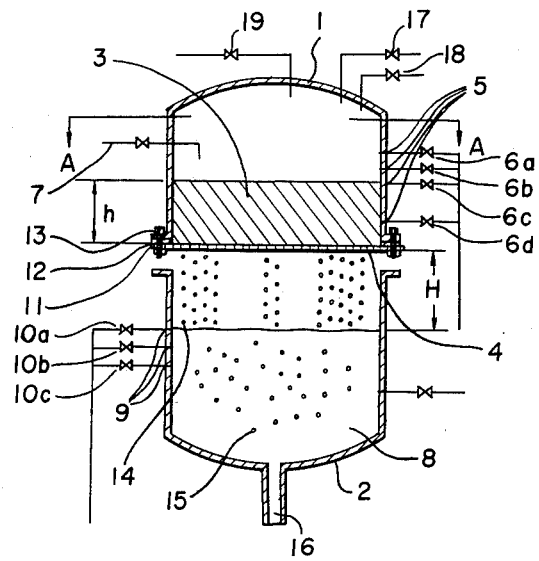
FIG. 1 is a front sectional view of a tank in which the latex mixture is dropped and the vessel in which the granular rubber is formed.
Figure 2:
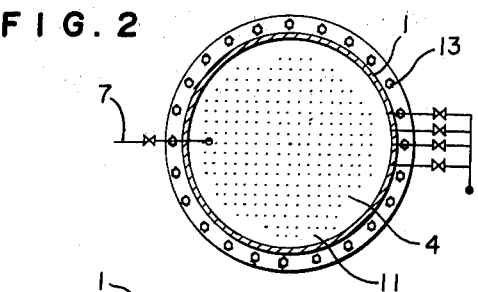
FIG. 2 is a sectional view taken along the line of A—A in FIG. 1.

A mixture of a rubber latex and a high molecular weight polyanion containing carboxylate and/or hydroxyl groups (hereinafter referred to as a latex mixture) is allowed to fall dropwise from a nozzle having at least one hole into an aqueous solution of an alkaline earth metal salt in a vessel having an overflow outlet which controls the level of the aqueous solution which in turn controls the free falling distance between 1–80 cm. Suitable rubber latexes used in the present invention include natural rubber latexes and synthetic rubber latexes prepared with an anionic emulsifier or a nonionic emulsifier. Anionic or nonionic synthetic rubber latexes can be prepared by emulsion polymerization techniques and anionic or nonionic synthetic rubber latexes can be prepared by emulsifying a polymer in an organic solvent solution (solution polymerization) with an emulsifier and water and removing the organic solvent.

Suitable synthetic rubber latexes include latexes of polybutadiene rubber, polyisoprene rubber, chloroprene rubber, butadiene-styrene copolymer rubber, butadiene-acrylonitrile copolymer rubber and the like. The rubber latex can contain a filler such as calcium carbonate, magnesium carbonate or the like, as well as a reinforcing agent such as carbon black, fine silica or the like.

The high molecular weight polyanion containing carboxylate groups and/or hydroxyl groups include mannan, agar, Carrageenan, sodium alginate, sodium carboxymethyl cellulose; polymers and copolymers of a vinyl monomer or a vinyl monomer containing carboxyl groups such as acrylic acid, maleic anhydride and polyacrylic acid derivatives. Also suitable are sodium polyvinylsulfonate, sodium polystyrene sulfonate and the like. It is preferable to use sodium alginate, sodium carboxymethyl cellulose or sodium polyacrylate. It is also possible to add a lubricant such as silica and a surfactant to the polyanion.

In the process of the present invention, the amount of polyanion combined with the rubber latex ranges from 2–8 parts by weight, preferably 4–6 parts by weight per 100 weight parts of rubber in the rubber latex. If the amount of the polyanion is less than 2 parts by weight, the sealing effect by a film of alkaline earth metal salt of the polyanion is not enough to prevent adhesion of granular rubber. If the amount of the polyanion is greater than 8 parts by weight, the characteristics of the rubber deteriorate. The viscosity of the latex mixture ranges from 200–8,000 cps, preferably 1,000–3,000 cps. If the viscosity is less than 200 cps, the shape of the rubber deforms and thus it is difficult to obtain a granular rubber having a uniform shape. If the viscosity is greater than 8,000 cps, the viscosity is too high to handle the latex mixture and it is difficult to allow the latex mixture to fall freely dropwise. Even though the latex mixture can fall dropwise, the rate of fall is too slow whereby it is necessary to accelerate the velocity by pressurizing the tank containing the latex mixture. Even though a high pressure is applied to the tank, it is difficult to obtain a granular rubber having a uniform shape and diameter. In accordance with the process of the invention, the latex mixture is allowed to fall dropwise into an aqueous solution containing at least one alkaline earth metal salt over a free falling distance of 1–80 cm, to prepare the granular rubber. If the free fall distance is less than 1 cm, the latex mixture which falls into the aqueous solution does not form into a spherical shape, but rather forms rubber particles of a variety of shapes. The rubber particles float in the aqueous solution and adhere to one another. If the free fall distance is more than 80 cm, spherically shaped rubber latex particles initially form, but then are immediately deformed and scattered at the moment of contact with the aqueous solution of the alkaline earth metal salt. The rubber particles which form are hard to obtain having a uniform shape and diameter.

Suitable alkaline earth metal salts include the chlorides of beryllium, calcium, barium and strontium, especially calcium chloride, strontium chloride and barium chloride, and mixtures thereof. The concentration of the alkaline earth metal salt is usually 1–10 weight %, preferably 2–6 weight %. If the concentration is less than 1 weight %, the reaction of the polyanion is too slow for the granular rubber to adhere. If the concentration is higher than 10 weight %, the granular rubber particles float in the aqueous solution of the alkaline earth salt and adhere to each other.

The granular rubber prepared by the process of the invention is defined by small particles of rubber having any shape but preferably a spherical, cylindrical or disc shape with a diameter of 0.5–8 mm, especially 1.5–5 mm. The shape and diameter of the granular rubber particles which form are dependent upon the amount of the polyanion, the viscosity of the latex mixture, the free falling distance and aqueous solution control level, the shape and size of the hole in the nozzle.

FIG. 1 shows the front sectional view of one embodiment of the apparatus used to prepare the granular rubber. Tank 1 contains the latex mixture 3 from which the latex falls dropwise into vessel 2 through at least one hole 4 of a nozzle. At least one overflow outlet 5 controls the height $h$ of the latex mixture 3 in vessel 2. In FIG. 1, the latex mixture 3 is fed through pipe 7 to maintain the height $h$ of the latex mixture 3 by opening the overflow valve 6c and closing valves 6a, 6b, and 6d. The latex mixture 3 is allowed to fall dropwise through the holes 4 of the nozzle into the aqueous solution of alkaline earth metal salt in the vessel 2 equipped with the overflow outlet 9 which controls the level of the aqueous solution maintaining the free falling distance H. The reference numbers 10a, 10b and 10c are overflow valves which control the level of the latex mixture, and are used to maintain the free falling distance H. In FIG. 1, the valves 10b, 10c are closed and the valve 10a is opened and the free falling distance is maintained at H.

The perforated plate 11 contains many holes 4, and can be fitted through a packing with bolts 13 so that the plate is detachable for washing and so that it can be readily exchanged. The drops 14 of the latex mixture which descend from the perforated plate 11 react with the aqueous solution 8 containing at least one alkaline earth metal salt, to form the granular rubber particles 15. The granular rubber particles 15 are transferred from the outlet 16 of the vessel 2 through the overflow valve 10a for the next step. A pressurizing valve 17, a pressure control valve 18 and a valve for washing 19 are attached to the tank 1 and control the dropping of the latex mixture. The shape of the hole 4 can be varied to any desired shape and size. If a circular hole is employed, the diameter of the hole is 0.5–10 mm, preferably 1–4 mm. If the diameter is less than 0.5 mm, it is difficult for the drops to fall. Even though the drops can fall, it takes a lot of time time for the drops 14 of the latex mixture to form, and consequently, clogging is frequently encountered.

If the diameter of the holes is more than 10 mm, the latex mixture 3 disadvantageously falls through the holes 4 in a thread shape. It is preferable to control the height $h$ of the latex mixture by opening or closing the overflow valves 6a, 6b, 6c and 6d. It is necessary to maintain the height $h$ of the latex mixture 3 when the diameter is more than 5 mm. The height $h$ of the latex mixture 3, which falls dropwise into the vessel 2, can be controlled by the viscosity of the latex mixture and the diameter of the hole 4. The gap between the holes 4 can be 1–3 cm, preferably 1.5–2.0 cm. If the gap is less than 1 cm, the drops of the latex mixture adhere to themselves while falling and form large drops. When this happens, granular rubber particles having a uniform diameter cannot form. If the gap is more than 3 cm, a large size tank 1 is disadvantageously required. The thickness of the perforated plate 11 depends upon the weight of the latex mixture fed to tht tank 1. The material used for the fabrication of the perforated plate 11 is not limited and preferably is steel. The free fall distance can also be controlled by vertically moving the vessel 1. The granular rubber formed in the vessel 1 is aged, washed, dehydrated and dried to give a free-flowing granular rubber having a uniform shape with a particle diameter of 1–8 mm.

Figure 3:
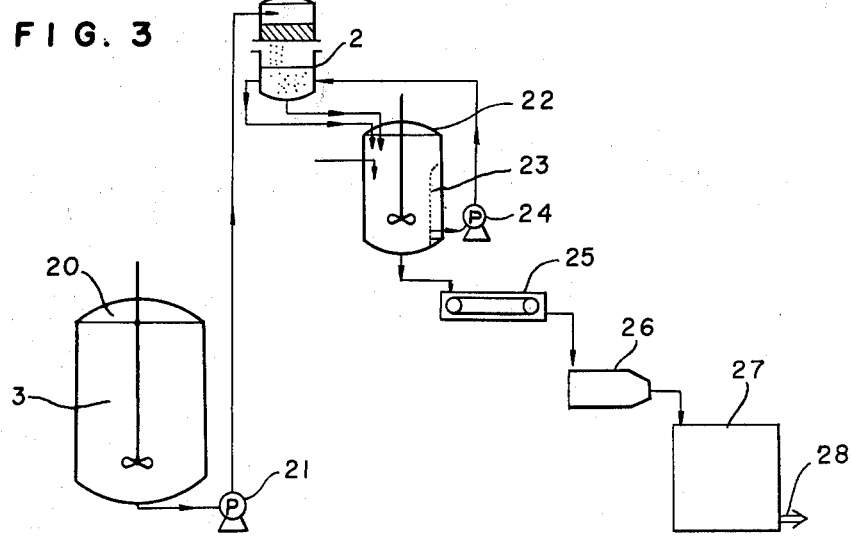
FIG. 3 is a process diagram showing the process of the present invention.

FIG. 3 is a process diagram which includes a finishing step. To fill tank 1, the latex mixture 3 is fed from a storage tank 20 by pump 21. The granular rubber particles formed by allowing the latex mixture to fall dropwise into the vessel 2 are fed to an aging vessel 22 to achieve aging. The aqueous solution of the alkaline earth metal salt in the aging vessel 22 is preferably recycled with stirring by pump 24 through filter 23 to the vessel 2. The aged granular rubber particles are filtered and washed in a washing device 25 and are dehydrated by a centrifugal separator or a vibration dehydrator 26. The dehyrated granular rubber is dried in drier 27 such as a flowing drier, a vibration drier, or the like to give the product. In accordance with the apparatus for preparing the granular rubber, the structure of the apparatus is simple and the granular rubber can be prepared at room temperature except in the drying step so as to simplify the finishing step, and to obtain a granular rubber which has less of a thermal effect. The free-flowing granular rubber prepared by the present invention has a uniform granular shape and has no tackiness. Accordingly, handling of the rubber if easy and the rubber can be automatically weighed. The granular rubber can be molded in a molding machine such as a uniaxial extruder or a biaxial extruder in order to blend into pellets of a synthetic resin.

Having generally described this invention, a further understanding can be obtained by reference to certain specific examples which are provided herein for purposes of illustration only and are not intended to be limiting unless otherwise specified.

EXAMPLE 1

A 40% polychloroprene latex (100 parts by wt. as a solid component) prepared by the conventional process using rosin was admixed with 2% of an aqueous solution of sodium alginate having a viscosity of 3000 cps (4 parts by weight as a solid component) with stirring at room temperature to obtain a latex mixture having a viscosity of 1900 cps. The latex mixture was fed into a tank equipped with a perforated plate having many holes of 2 mm diameter. The mixture was allowed to fall dropwise into a 2% aqueous solution of calcium chloride as spherical drops with a diameter of 4.6 mm. The gaps between the holes were 1.5 cm, and the free falling distance was kept to 10 cm. The resulting granular chloroprene rubber prepared by allowing the rubber to fall dropwise was fed into an aging vessel where the rubber was aged for 20 minutes. The granular chloroprene was transferred with the aqueous solution of calcium chloride to a filtering and washing apparatus, wherein the granular rubber was filtered and washed sufficiently. The granular chloroprene rubber had a diameter of about 4.6 mm and contained about 70% of water. The granular chloroprene rubber was dehydrated by a centrifugal separator for 5 minutes, and was dried at 110° C for 2 hours in a dried (Fuji Speed drier FDSI type), whereby the granular rubber obtained had a diameter of 3 mm and a volatile matter content of 0.6%. The vulcanized granular chloroprene rubber had a tensile strength of 225 kg/cm$^2$ and an elongation of 455%. (JIS K 6301, 1971).

EXAMPLES 2–5 AND REFERENCE EXAMPLES 1–2

The process of Example 1 was repeated except that the amount of sodium alginate to 40% polychloroprene latex (100 parts by weight of solid component) to 2–8 parts by weight was varied and the free falling zone was maintained at a height of 10 cm. The results are shown in Table 1. As a reference example, the process was also repeated except that 1 part or 9 parts of sodium alginate were used. These results are also shown in Table 1.

TABLE 1

|  | Ref. 1 | Exp. 2 | Exp. 3 | Exp. 4 | Exp. 5 | Ref. 2 |
|---|---|---|---|---|---|---|
| sodium alginate (PHR) | 1 | 2 | 4 | 6 | 8 | 9 |
| viscosity of the latex mixture (cps) | 950 | 1500 | 1860 | 2120 | 2240 | 2440 |
| tackiness between granules | high | none | none | none | none | high |

EXAMPLES 6–11 AND REFERENCE EXAMPLES 3–4

The process of Example 1 was repeated with the polychloroprene latex and the aqueous solution of sodium alginate, and a latex mixture having a viscosity of 1800 cps was obtained. The granular rubber particles were prepared by varying the free falling distance in a range of 1–80 cm. The results are shown in Table 2. As a reference example, the same operation was repeated except that the falling distance was varied to 0.8 cm or 85 cm. The results are also shown in Table 2.

TABLE 2

|  | Ref. 3 | Exp. 6 | Exp. 7 | Exp. 8 | Exp. 9 | Exp. 10 | Exp. 11 | Ref. 4 |
|---|---|---|---|---|---|---|---|---|
| Falling distance (cm) | 0.8 | 5 | 15 | 18 | 27 | 55 | 80 | 85 |
| Shape of drops | def. | sph. | sph. | sph. | sph. | sph. | sph. | def. |
| Tackiness of granules | high | none | none | none | none | none | none | high |
| Falling speed of drops | *slow | *slow | good | good | good | good | good | — |
| Float of granules | float | sed. | sed. | sed. | sed. | sed. | sed. | float |

Note:
*slightly slow
def.: deformation
sph.: spherical
sed.: sedimentation

In Examples 8–11 and Reference Examples 3–4, the heights from which the latex mixture was allowed to fall, were maintained by adjusting the control value.

EXAMPLES 12–16 AND REFERENCE EXAMPLES 5–8

The latex of Example 1 was admixed with the same amount of aqueous solutions of sodium alginate which were different in concentration or molecular weight to obtain various latex mixtures having various viscosities (620 cps.-7900 cps.). The granular rubbers were prepared by using various perforated plates having holes of various diameters of 1–9 mm and by varying the free falling distance. The results are shown in Table 3. As reference examples, the same operation was repeated except that a latex mixture having a viscosity of 150 cps or 8500 cps was used. The perforated plate contained holes with a diameter of 0.5 mm or 11 cm. The results are also shown in Table 3.

Table 3

|  | Ref. 5 | Ref. 6 | Exp. 12 | Exp. 13 | Exp. 14 | Exp. 15 | Exp. 16 | Ref. 7 | Ref. 8 |
|---|---|---|---|---|---|---|---|---|---|
| Sodium alginate M.W. (× 10$^3$) | 16.5 | 16.5 | 16.5 | 20.8 | 23.4 | 25.8 | 25.8 | 25.8 | 25.8 |
| concentration (%) | 1.0 | 1.5 | 2.0 | 2.0 | 2.0 | 2.0 | 2.5 | 3.0 | 2.0 |
| Viscosity of latex mixture(cps) | 150 | 620 | 1280 | 2550 | 3160 | 5100 | 7900 | 8500 | 1280 |
| Diameter of holes of perforated plate (mm) | 3 | 0.5 | 1 | 2 | 3 | 6 | 9 | 10 | 11 |
| Falling distance (cm) | 100 | 120 | 10–30 | 15–60 | 25–70 | 30–75 | 35–80 | 85 | 150 |
| Shape of granular rubber | def. | def. | sph. | sph. | sph. | sph. | sph. | def. | def. |
| Tackiness of granules | high | none | none | none | none | none | none | high | high |
| Handling of latex mixture | — | — | easy | easy | easy | easy | slightly | hard | — |

Table 3-continued

|  | Ref. 5 | Ref. 6 | Exp. 12 | Exp. 13 | Exp. 14 | Exp. 15 | Exp. 16 | Ref. 7 | Ref. 8 |
| --- | --- | --- | --- | --- | --- | --- | --- | --- | --- |
| Falling speed of drops | good | slow | good | good | good | good | hard good | slow | — |
| Diameter of granules of rubber after drying (mm) | 3.2–3.5 | 1.3–1.5 | 1.5–1.8 | 2.4–2.6 | 3.2–3.5 | 3.5–4.5 | 4.0–7.5 | — | — |

EXAMPLES 17–20 AND REFERENCE EXAMPLES 11–12

The process of Example 1 was repeated except that a 3% aqueous solution of sodium carboxymethyl cellulose (2–8 parts by weight as a solid component — viscosity of 3760 cps) was used instead of sodium alginate, and the latex mixture was allowed to fall a distance of 10 cm. The products were washed and dried and a disc type granular rubber was obtained having a diameter of about 3.2 mm. The results are shown in Table 4. As reference examples, the results obtained by adding 1 part or 10 parts by weight of sodium carboxymethyl cellulose are also shown in Table 4.

Table 4

|  | Ref. 11 | Exp. 17 | Exp. 18 | Exp. 19 | Exp. 20 | Ref. 12 |
| --- | --- | --- | --- | --- | --- | --- |
| Amount of Na-CMC (PHR) | 1 | 2 | 4 | 6 | 8 | 10 |
| Viscosity of latex mixture (cps) | 770 | 1210 | 1420 | 1680 | 1980 | 2500 |
| Tackiness of granules | high | none | none | none | none | high |

EXAMPLE 21

The process of Example 1 was repeated except that a 2% aqueous solution of sodium polyacrylate (4 parts by weight as a solid component — viscosity of 5500 cps) was used instead of sodium alginate whereby a latex mixture of a viscosity of 2300 cps was obtained. As a result, spherical granular rubber particles having a diameter of about 2.4 mm were obtained after washing and drying the product.

EXAMPLE 22

A 42% solution of nonionic polychloroprene latex (100 parts by weight as a solid component) prepared by emulsion polymerization using a nonionic surfactant was admixed with a 2% aqueous solution of sodium alginate (3 parts by weight as a solid component) with stirring to obtain a latex mixture having a viscosity of 1240 cps. The latex mixture was allowed to fall dropwise and then the rubber obtained was washed and dried in accordance with the process of Example 1. As a result, spherical granular rubber particles having a diameter of 3.0 mm were obtained.

EXAMPLE 23

The process of Example 1 was repeated except that a 2% aqueous solution of sodium alginate (4 parts by weight as a solid component) was admixed with a 59% anionic butadiene rubber latex (BR latex — 100 parts by weight as a solid component) instead of the anionic polychloroprene latex, whereby a latex mixture with a viscosity of 1640 cps was obtained. As a result, spherical granular BR rubber particles with no tackiness and a diameter of 4.5 mm were obtained.

EXAMPLE 24

A 41% anionic latex of acrylonitrile-butadiene copolymer rubber (NBR latex — 100 parts by weight of solid component) was admixed with a 2% aqueous solution of sodium alginate (4 parts by weight of solid component) with stirring to obtain a latex mixture with a viscosity of 1590 cps. The latex mixture was allowed to fall dropwise into a 5% aqueous solution of strontium chloride in accordance with the process of Example 1 (10 cm falling distance). As a result, spherical granular NBR rubber particles having a diameter of 3.2 mm were obtained.

EXAMPLE 25

A 69% anionic latex of styrene-butadiene copolymer rubber (SBR latex — 100 parts by weight of solid component) was admixed with a 2% aqueous solution of sodium alginate (4 parts by weight of solid component) with stirring to obtain a latex mixture having a viscosity of 6930 cps. The latex mixture was allowed to fall dropwise into a 6% aqueous solution of barium chloride in accordance with the process of Example 1 (10 cm falling distance). As a result, elliptical granular SBR rubber particles having a diameter of 4.2 mm were obtained.

EXAMPLE 26

The process of Example 1 was repeated except that a mixture of a 2% aqueous solution of calcium chloride and a 2% aqueous solution of barium chloride (1:1) was used instead of a 2% aqueous solution of calcium chloride. As a result, spherical granular rubber particles having a diameter of 2.8 mm were obtained.

EXAMPLE 27

The process of Example 1 was repeated except that a mixture of a 4% aqueous solution of barium chloride and a 2% aqueous solution of strontium chloride (1:1) was used instead of a 2% aqueous solution of calcium chloride. As a result, spherical granular rubber particles having a diameter of 3.0 mm were obtained.

Having now fully described this invention, it will be apparent to one of ordinary skill in the art that many changes and modifications can be made thereto without departing from the spirit or scope of the invention as set forth herein.

What is claimed as new and intended to be secured by Letters Patent is:

1. A process for preparing granular rubber, which comprises:
   allowing a latex mixture of a rubber latex and an aqueous solution of a high molecular weight polyanion containing carboxylate groups, hydroxyl groups or a mixture thereof to fall freely drop-wise for a distance of from 1 to 80 cm. into an aqueous solution of an alkaline earth metal salt; wherein:

a. from 2 to 8 parts by weight of said polyanion is admixed with 100 parts by weight of rubber in the rubber latex;
b. said latex mixture has a viscosity of from 200–8,000 cps; and
c. said aqueous solution of an alkaline earth metal salt has a concentration of from 1 to 10 wt. %;
and recovering the granular rubber.

2. The process of claim 1, wherein from 4–6 parts by weight of the high molecular weight polyanion is admixed with 100 weight parts of the rubber in the rubber latex.

3. The process of claim 1, wherein the viscosity of the latex mixture is from 1,000 to 3,000 cps.

4. The process of claim 1, wherein the concentration of the alkaline earth metal salt is from 2–6 weight %.

5. The process of claim 1, wherein said polyanion is selected from the group consisting of sodium alginate, sodium carboxymethyl cellulose, and polyvinyl compounds containing carboxyl groups.

6. The process of claim 1, wherein said polyanion is sodium polyacrylate.

* * * * *